Oct. 5, 1954 R. K. SEDGWICK 2,690,768
PRESSURE RESPONSIVE DEVICE
Filed Dec. 21, 1950

INVENTOR.
Robert K. Sedgwick
BY
Atty.

Patented Oct. 5, 1954

2,690,768

UNITED STATES PATENT OFFICE 2,690,768

PRESSURE RESPONSIVE DEVICE

Robert K. Sedgwick, Sharonville, Ohio, assignor to American Steel Foundries, Chicago, Ill., a corporation of New Jersey Application December 21, 1950, Serial No. 202,024

3 Claims. (Cl. 137—788)

This invention relates to a novel pressure responsive device for actuating a switch or an indicator such as a gauge.

The hydraulic press industry has for many years needed a pressure switch which would operate at pressures up to three thousand pounds per square inch, would have a long life in service, and would operate consistently with respect to the cut-in and cut-out pressure values. Resilient materials heretofore utilized for switch actuating diaphragms have not been satisfactory inasmuch as relatively sensitive materials, such as rubber, have proved unsuitable for the lack of sufficient strength to resist high pressures; and relatively stiff materials, such as steel and beryllium copper, have proved too rigid to afford sufficient sensitivity and operating range when made sufficiently strong. Various switch actuators have been used with diaphragms having borderline strength so that after relatively few operations the diaphragms have failed. Furthermore, many switches have been designed utilizing spring loaded plungers; however, such plungers must be lapped to substantially eliminate friction thereby involving prohibitive costs.

A general object of the invention is to provide a novel pressure responsive switch actuator which is strong enough to have a substantial safety factor and fatigue resistance yet flexible enough to have a substantial deflection under load thereby affording sensitivity and accommodating close adjustment.

A more specific object of the invention is to devise an arrangement wherein the required strength and flexibility are combined in one member.

Another object of the invention is to devise a pressure responsive device affording a differential in the operation thereof. In other words, if a pressure of, for example, two thousand pounds per square inch is required to actuate the switch or indicator associated with the pressure responsive device, a pressure drop of, for example, two hundred pounds per square inch is required to release the switch or indicator. This characteristic is generally regarded as desirable in industrial pressure switches.

A further object of the invention is to devise a pressure responsive device which is substantially indestructible in service, by providing means for protecting the actuator element from hydrostatic shock.

Still another object of the invention is to provide an actuator element which comprises a sufficient range of travel to accommodate a wide range of adjustment and which is subjected to very low stresses at all times.

The foregoing and other objects and advantages of the invention will become apparent from a consideration of the following specification and the accompanying drawings, wherein.

Figure 1:
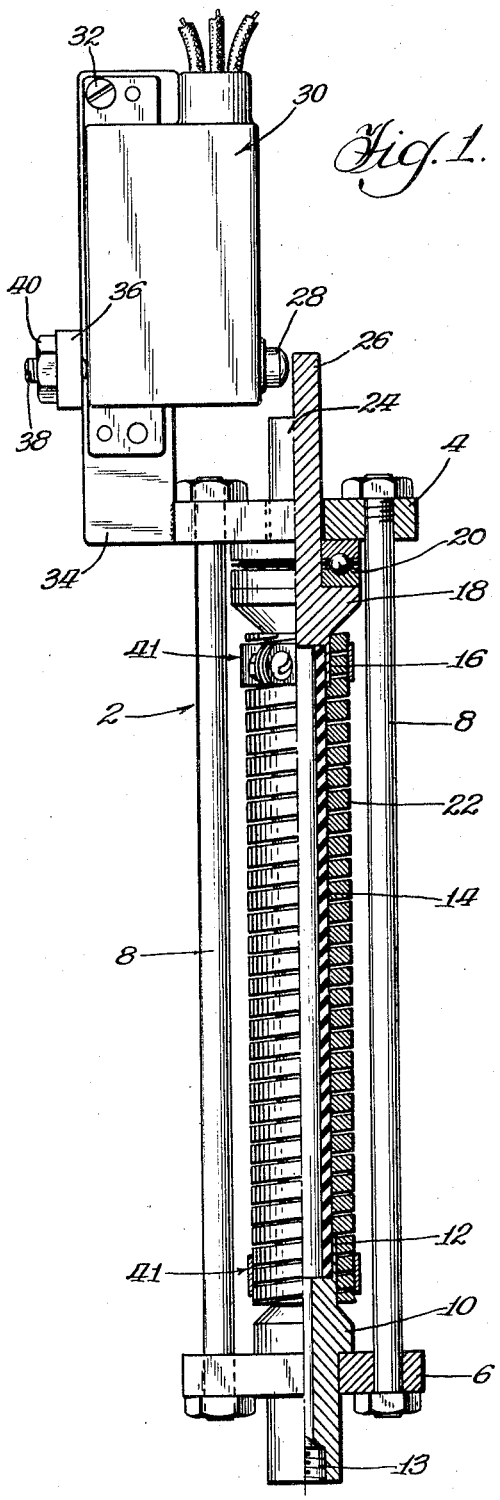
Figure 1 is a side view of a pressure responsive device embodying the invention and associated with a switch to be actuated thereby, the left half of said device being shown in elevation and the right half being shown in central vertical section.
Figure 2:
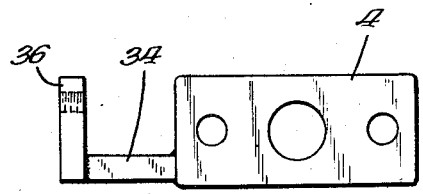
Figure 2 is a plan view of the upper head and switch support frame of the structure shown in Figure 1.
Figure 3:
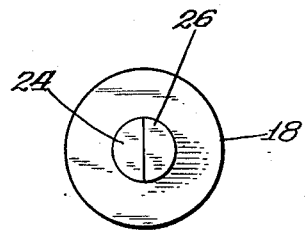
Figure 3 is a top plan view of the upper seal and switch actuator.

Describing the invention in detail and referring to the drawings, the novel pressure responsive device comprising a frame generally designated 2, and comprising a pair of top and bottom heads or yokes 4 and 6 interconnected by bolt and nut assemblies 8.

The bottom head 6 supports a seal or thrust member 10 having an upwardly extending annular flange 12 snugly fitted around a tube 14 of flowable resilient material such as, for example, a conventional rubber hosing. The member 10 is provided with a port 13 connected to the interior of the tube 14 and adapted for connection to an associated source of pressure to which the device is adapted to be responsive.

The upper end of the tube 14 is snugly fitted within a depending annular flange 16 of another seal or thrust member 18, which transmits hydraulic thrust to the head 4 by means of a conventional roller type anti-friction thrust bearing 20.

The tube 14 is snugly fitted within a helical spring 22, preferably formed of square section stock and having its upper and lower extremities recessed to accommodate the flanges 12 and 16 so that the tube 14 is afforded a continuous seat against the interior surfaces of the spring 22 and the flanges.

The member 18 is provided with an upwardly extending cylindrical portion 24 rotatably fitted within a complementary opening of the head 4, said portion 24 being formed at its upper extremity with an actuator nose or extension 26 having a flat side engageable with a make and break element 28 of a conventional snap action switch 30 pivotally mounted at 32 on a frame 34 connected to the head 4. The frame 34 comprises a lug 36 within which is threaded a set screw 38 having a lock nut 40 threaded thereon.

Thus it will be understood that by operation of the set screw 38, the switch 30 is rotated about its pivot point 32 to adjust the space between the element 28 and the actuator lug 26.

The ends of the spring 22 are preferably clamped as by conventional hose clamps 41 to the flanges 12 and 16, to positively prevent rotational creeping of the spring with respect to the members 10 and 18.

In operation of the device, pressure admitted to the interior of the tube 14 from the port 13 causes the latter to expand circumferentially while being restrained against longitudinal movement by the heads 4 and 6 and the thrust bearing 20. Circumferential expansion of the tube 14 causes the spring 22 to unwind under circumferential stress, thereby rotating the actuator lug 26 to operate the switch element 28. Unwinding of the spring 22 is strongly damped by the hysteretic effect of the spring rubber tube assembly, thereby accommodating a differential in operation of the switch 30. For example, if a pressure of two thousand pounds per square inch is required to actuate switch 30, the latter will not reset until pressure has dropped to a value of, for example, eighteen hundred pounds per square inch.

It may be noted that in the illustrated embodiment of the invention the member 10 is frictionally held against rotation relative to the head 6 by thrust of hydraulic pressure in the tube 14; however, if desired, the member 10 may be anchored to the head 6 by welding or may be formed integrally therewith, the upper seal or thrust member 18 being free to rotate about the longitudinal axis of the tube 14 and spring 22 by reason of the thrust bearing 20 which may be of any conventional design.

I claim:

1. A pressure responsive device of the class described comprising a pair of heads, means limiting movement of said heads away from each other, a thrust member seated against the inner side of one head, another thrust member, bearing means between said other member and the inner side of the other head for accommodating rotation of said other member, a resilient unit comprising a tube extending between and sealed to said members and a helical spring of rectangular cross section coiled around and continuously abutting the tube, said unit having rigid connection to the members, and a port through one of the members connected to the interior of the tube for admitting pressure fluid therethrough to expand the tube thereby uncoiling the spring and rotating said other member.

2. A fluid pressure responsive device of the class described comprising a frame including spaced heads fixed against movement away from each other, a thrust member seated against the inner side of one head and having a portion extending through a complementary opening therethrough, another thrust member having a portion extending through a complementary opening of the other head, anti-friction thrust bearing means between the inner side of said other head and a facing surface of said other member, said members having flanges projecting from their inner ends, a rubber tube snugly fitted within said flanges, and a square-section helical spring coiled around and frictionally engaging the tube and having rigid connection to said flanges, one of said members having a port through its portion for conveying fluid pressure to the interior of the tube.

3. A pressure responsive device of the class described comprising a fixed thrust member, a rotatable thrust member fixedly spaced therefrom, a helical spring of rectangular cross section having a resilient tube embraced by and engaging its inside diameter surface, rigid connections at opposite ends of said spring to the fixed thrust member and rotatable thrust member, and passage means permitting the ingress and egress of the pressure fluid to the tube, whereupon entrance and exit of said pressure fluid, a hysteretic angular motion is imparted to the rotatable member.

References Cited in the file of this patent

UNITED STATES PATENTS

| Number | Name | Date |
|---|---|---|
| 1,525,156 | Teufl | Feb. 3, 1925 |
| 2,404,843 | Huber | July 30, 1946 |
| 2,411,251 | Feld | Nov. 19, 1946 |
| 2,520,660 | Sedgwick | Aug. 29, 1950 |
| 2,562,385 | Marcellus | July 31, 1951 |

FOREIGN PATENTS

| Number | Country | Date |
|---|---|---|
| 3,626 | Great Britain | Nov. 28, 1868 |
| 5,025 | Great Britain | of 1898 |